Patented Mar. 2, 1926.

1,574,771

UNITED STATES PATENT OFFICE.

GEORGE J. VOTAPEK, OF MILWAUKEE, WISCONSIN, ASSIGNOR TO THE CUTLER-HAMMER MFG. CO., OF MILWAUKEE, WISCONSIN, A CORPORATION OF WISCONSIN.

PLASTIC COMPOSITION MATERIAL AND METHOD OF PRODUCING THE SAME.

No Drawing.   Application filed July 10, 1922. Serial No. 574,077.

*To all whom it may concern:*

Be it known that I, GEORGE J. VOTAPEK, a citizen of the United States, residing at Milwaukee, in the county of Milwaukee and State of Wisconsin, have invented new and useful Improvements in Plastic Composition Materials and Methods of Producing the Same, of which the following is a full, clear, concise, and exact description.

This invention relates to plastic composition materials and method of producing the same.

More particularly the invention relates to materials, and to production of materials, adapted to form-giving treatment under pressure with subsequent or concurrent heat curing, such materials ordinarily comprising a binder and a relatively inert filler impregnated thereby.

The present invention has as an object that of improving material of the general character aforementioned.

Another object is that of providing such material whereof the finished shapes exhibit increase and improvement in mechanical strength and other desirable properties.

Another object is that of providing such a plastic material which is adapted to quick or cold form-giving treatment with subsequent heat cure even though a considerable time may elapse between production and forming of the material.

Another and more specific object is that of providing such a quick or cold molding material of high plasticity and whereof the formed but uncured pieces exhibit increased ruggedness and resistivity to mechanical injury.

Another object is that of providing a binder substance which is adapted to impregnation of relatively increased quantities of filler material for production of plastic material possessing the foregoing improved characteristics.

Another object is that of providing methods of producing such improved material.

Other objects and advantages will hereinafter appear.

The aforementioned binder comprises generically a resin which is the reaction product of an organic substance and a halogen derivative of an element of the sulphur type, the organic substance being for example a phenolic body such as phenol, cresol or the like, whereas the inorganic reagent may comprise a halogen derivative of an element of the sulphur type, as for example, a chloride of sulphur, selenium monochloride, etc., such substances having been found to react under suitable conditions for formation of a resinous substance which is well adapted to act as a binder in conjunction with asbestos or other inert filler material. Moreover such binder and filler materials when suitably prepared, incorporated and otherwise treated have been found to produce plastic material which is well adapted to a quick or cold molding treatment followed by prolonged heat cure.

According to the present invention it is proposed to improve the aforedescribed product by incorporating therein, a substance proposed in Steinberg Patent No. 1,233,415. More particularly the present invention contemplates incorporation of a small quantity of stearine pitch in the binder material aforecharacterized and I have found that as a result of such addition, prior to addition of the filler, the ruggedness of the uncured molded product and its resistivity to mechanical injury are very materially increased, while the transverse strength of the cured pieces is very appreciably augmented. The total weight of the binder with reference to the weight of filler material may be considerably reduced as a result of such treatment, the plasticity of the unformed material and also the desirable characteristics of the finished pieces being not appreciably impaired.

As typical of the manner in which the aforeindicated process may be enacted, a quantity of stearine pitch is melted and thinned with approximately 30% of its own weight of volatile or other solvent substance such for example as benzol, coal tar oil or the like. Thereafter a quantity of this material sufficient to contain 175 parts by weight of stearine pitch is thoroughly mixed with approximately 1225 parts by weight of a melted resinous reaction product of an organic substance and a halogen derivative of an element of the sulphur type, as aforedescribed. After thorough mixture of the aforementioned ingredients the composite binder is incorporated in a quantity of inert filler, as for example asbestos, comprising approximately 5000 parts by weight, such incorporation being effected preferably in a kneading machine or the like.

The step of incorporation of the aforedescribed filler and binder materials may be facilitated and hastened by the addition of a suitable quantity of a volatile or other solvent such as acetone, coal tar oil or the like. Following such incorporation the material is disintegrated or comminuted, screened and subjected to other known treatments following which the material may be subjected to quick molding with subsequent heat curing.

Formed and uncured pieces composed of material produced as aforedescribed are found to be of very materially increased "body", and to possess markedly augmented ruggedness with reduced susceptibility to distortion and reception of dents, impressions or other mechanical injury. Further the cured strength of pieces formed of such material is found to be quite materially increased, whereas the proportion of binder to filler required is considerably reduced.

While the aforedescribed process has been found highly advantageous in practice, nevertheless it is to be understood that the proportioning and also the character of certain of the various substances mentioned may be varied and the treatment otherwise modified without departing from the spirit and scope of the appended claims.

It is to be understood that the terms "phenolic body", "halogen derivative of sulphur", and the like as used in the claims are merely illustrative of the numerous organic bodies and halogen derivatives of elements of the sulphur type, which are capable of joint reaction to form a resin of the general class herein described, and in the formation of which my present improvement may be applied. That is to say, my invention resides essentially in modification of the ingredients of and processes for producing plastic composition materials of the aforementioned character, to provide for attainment of the novel results enumerated.

What I claim as new and desire to secure by Letters Patent is:

1. The process of treating a binder to improve the properties thereof for use in plastic composition material, said binder comprising the reaction product of a phenolic body and a halogen derivative of sulphur, which comprises incorporating in such binder a small quantity of stearine pitch.

2. The process of treating a binder to improve the properties thereof for use in plastic composition material, said binder comprising the reaction product of a phenolic body and a halogen derivative of sulphur, which comprises incorporating in such binder a small quantity of stearine pitch dissolved in a solvent.

3. The process of producing plastic composition material, which comprises incorporating, in a reaction product of a phenolic body and a halogen derivative of sulphur, a relatively small quantity of stearine pitch for a binder, and impregnating a relatively inert filler with such binder.

4. The process of producing plastic composition material, which comprises incorporating, in a reaction product of a phenolic body and a halogen derivative of sulphur, a relatively small quantity of stearine pitch thinned with a suitable solvent, and impregnating a relatively inert filler with the resultant binder.

5. The process of producing plastic composition material, which comprises incorporating, in a reaction product of cresol and a chloride of sulphur, a relatively small quantity of stearine pitch, and impregnating a relatively inert filler with the binder so constituted.

6. A binder for use as a constituent of plastic composition material, comprising the reaction product of a phenolic body and a halogen derivative of sulphur, having incorporated therein a small quantity of stearine pitch.

7. A plastic composition material comprising a binder and a relatively inert filler impregnated thereby, said binder comprising the reaction product of a phenolic body and a halogen derivative of sulphur, having incorporated therein a small quantity of stearine pitch.

8. A plastic composition material adapted to a rapid form-giving treatment followed by heat cure, comprising a binder and a relatively inert filler impregnated thereby, said binder comprising the reaction product of cresol and a chloride of sulphur having incorporated therein a small quantity of a solution of stearine pitch in acetone.

9. A hardened shape, having as constituents, a binder which is the reaction product of a phenolic body and a halogen derivative of sulphur, such reaction product having incorporated therein a relatively small quantity of stearine pitch, and a relatively inert filler impregnated with such binder.

10. An article of manufacture, comprising a formed and heat hardened body of material having as constituents a relatively inert filler and a binder, which is the reaction product of a phenolic body and a halogen derivative of sulphur, having incorporated therein a relatively small quantity of stearine pitch.

11. The process of treating a binder to improve the properties thereof for use in plastic composition material, said binder comprising the reaction product of cresol and an agent capable of furnishing a quantity of sulphur and capable of reacting with the cresol, which comprises incorporating in such binder a small quantity of stearine pitch.

12. The process of treating a binder to improve the properties thereof for use in plastic composition material, said binder comprising the reaction product of a phenolic body and an agent capable of furnishing a quantity of sulphur and capable of reacting with the phenolic body, which comprises incorporating in such binder a small quantity of stearine pitch.

13. The process of treating a binder to improve the properties thereof for use in plastic composition material, said binder comprising the reaction product of a phenolic body and a suitable sulphur bearing or furnishing agent capable of reacting therewith, which comprises incorporating in such binder a small quantity of stearine pitch.

14. A binder for use as a constituent of plastic composition material, comprising a reaction product of a suitable phenolic body and an agent capable of furnishing a quantity of sulphur and capable of reacting with such phenolic body, having incorporated therein a small quantity of stearine pitch.

15. A plastic composition material comprising a binder and a relatively inert filler impregnated thereby, said binder comprising a reaction product of a suitable phenolic body and a sulphur bearing or furnishing agent, having incorporated therein a relatively small quantity of stearine pitch.

16. An article of manufacture, comprising a formed and heat indurated body of material having as constituents a relatively inert filler and a binder which is the reaction product of a suitable phenolic body and an agent capable of furnishing a quantity of sulphur, having incorporated therein a relatively small quantity of stearine pitch.

In witness whereof, I have hereunto subscribed my name.

GEORGE J. VOTAPEK.